(12) United States Patent
Chung

(10) Patent No.: US 11,459,738 B1
(45) Date of Patent: Oct. 4, 2022

(54) CONNECTION STRUCTURE OF CERAMIC CARTRIDGE OF FAUCET

(71) Applicant: Greatness Sanitary Industrial Co., Ltd., Xiushui Township, Changhua County (TW)

(72) Inventor: Wei-Cheng Chung, Xiushui Township (TW)

(73) Assignee: Greatness Sanitary Industrial Co., Ltd., Xiushui Township (TW)

( * ) Notice: Subject to any disclaimer, the term of this patent is extended or adjusted under 35 U.S.C. 154(b) by 0 days.

(21) Appl. No.: 17/342,704

(22) Filed: Jun. 9, 2021

(51) Int. Cl.
*E03C 1/04* (2006.01)
*F16K 27/00* (2006.01)
*F16K 31/44* (2006.01)

(52) U.S. Cl.
CPC ............... *E03C 1/04* (2013.01); *F16K 27/00* (2013.01); *F16K 31/44* (2013.01)

(58) Field of Classification Search
CPC .......... E03C 1/04; F16K 27/00; F16K 19/006; F16K 31/44; Y10T 137/9464
See application file for complete search history.

(56) References Cited

U.S. PATENT DOCUMENTS

| 5,398,717 | A | 3/1995 | Goncze |
| 6,929,029 | B1 | 8/2005 | Chung |
| 7,331,359 | B2 | 2/2008 | Shay |
| 10,281,049 | B2 * | 5/2019 | Ritter ........................ E03C 1/04 |
| 10,533,681 | B2 * | 1/2020 | Chen ..................... F16K 19/006 |

* cited by examiner

*Primary Examiner* — Michael R Reid
(74) *Attorney, Agent, or Firm* — Karin L. Williams; Alan D. Kamrath; Mayer & Williams PC

(57) ABSTRACT

A connection structure of a ceramic cartridge of a faucet contains: a control body, a rotatable operation rod, a connection ring, a stop ring, a guide ring, and a seal washer. The control body includes an accommodation space and an outlet. The guiding ring includes a fan-shaped hole corresponding to multiple stopping fringes of the stop ring. The control body includes an orifice, and the rotatable operation rod includes multiple O rings fitted thereon to avoid a leakage of the waters. The orifice has a recess, and the rotatable operation rod includes a notch for accommodating a C retainer. The rotatable operation rod includes an insertion, and the connection ring includes a receiving trough. The insertion has a hook, and the receiving trough has a cutout configured to engage with the hook. The connection ring includes a rib. The stop ring includes an aperture and multiple stopping fringes.

3 Claims, 4 Drawing Sheets

(A-A)

(B-B)

CONNECTION STRUCTURE OF CERAMIC CARTRIDGE OF FAUCET

FIELD OF THE INVENTION

The present invention relates to a connection structure of a ceramic cartridge of a faucet which is configured to connect a control valve of the faucet easily.

BACKGROUND OF THE INVENTION

A conventional control valve is configured to turn on/off a faucet by rotating a rotatable operation rod on an upper end of the control valve so as to drive a ceramic sheet to move, thus turning on/off waters from the faucet.

However, the control valve is complicated and is connected troublesomely.

A conventional control valve of a faucet is disclosed in U.S. Pat. No. 6,929,029. When a pressure of cold waters is more than a pressure of hot waters to flow back, the pressure of the cold waters pushes a stop film downward to contact an inlet, thus avoiding a back flowing of the cold waters. Nevertheless, it is difficult to align a rotatable operation rod with a stop ring, thus having troublesome connection.

Another conventional control valve is disclosed in U.S. Pat. No. 5,398,717 and contains: a rotation structure, wherein the rotation structure includes a body having an accommodation space configured to receive a control rod. When a fan-shaped opening is not communicated with an aperture formed in a sector shape, the waters do not flow into the aperture from the fan-shaped opening, wherein the control rod is pushed downward to connect with a coupling disc, and the control rod includes an insertion formed on a bottom of a controller, wherein the coupling disc has a cutout corresponding to the insertion and a rib extending from a bottom of the coupling disc to connect with a stop sheet. An inflow seat is mounted on a bottom of the body and includes a receiving groove defined on a center of a top of the inflow seat, and the inflow seat further includes a central hole. But the conventional control valve has a complicated structure (inclusive of the control rod) to cause a troublesome connection.

A control rod is disclosed in U.S. Pat. No. 7,331,359 and is formed in a circular column shape. The control rod includes an extension formed on a bottom thereof and limited in a receiving groove of a coupling disc, wherein a width of the extension is less than a width of the control rod (as shown in FIG. 3 of U.S. Pat. No. 7,331,359, a width 56 is less than a width 32). The coupling disc has a rib extending from a bottom thereof and driving a positioning disc to rotate, wherein the positioning disc has a driving recess defined on a top thereof and corresponding to the rib. However, no any locating structure is provided between the control rod and a body to have an excessive insertion of the operation rod, thus forcing the stop sheet and a ceramic sheet to move outward.

The present invention has arisen to mitigate and/or obviate the afore-described disadvantages.

SUMMARY OF THE INVENTION

The primary aspect of the present invention is to provide a connection structure of a ceramic cartridge of a faucet by which the rotatable operation rod is inserted and fixed into the control body accurately and easily.

To obtain above-mentioned aspects, a connection structure of a ceramic cartridge of a faucet provided by the present invention contains: a control body, a rotatable operation rod, a connection ring, a stop ring, a guide ring, and a seal washer.

The control body includes an accommodation space, and the rotatable operation rod is received in the control body and is connected with the connection ring. The stop ring, the guide ring and the seal washer are received in the accommodation space, a lower end of the control body is connected with a body of the faucet so as to flow waters, and the control body further includes an outlet defined on a middle section of the control body.

The connection ring is connected with the rotatable operation rod, and a lower end of the connection ring is connected with the stop ring, such that the rotatable operation rod is rotated so that the connection ring actuates the stop ring to revolve simultaneously, and the stop ring includes multiple stopping fringes formed on a lower end thereof.

The guiding ring is connected on the lower end of the stop ring, and the guide ring includes a fan-shaped hole defined thereon and corresponding to the multiple stopping fringes. The multiple stopping fringes are communicated to flow the waters or are closed to stop the waters.

The stop ring is fixed on the lower end of the control body, and the connection ring, the stop ring and the guide ring are limited in the accommodation space.

The control body includes an orifice defined on a center thereof and configured to accommodate the rotatable operation rod, and the rotatable operation rod includes multiple O rings fitted thereon to avoid a leakage of the waters.

The orifice has a recess defined on an upper end thereof, and the rotatable operation rod includes a notch defined on a predetermined position thereof and accommodating a C retainer, such that the rotatable operation rod is connected with the control body by using the C retainer securely.

The rotatable operation rod includes an insertion extending from a lower end thereof, and the connection ring includes a receiving trough defined on an upper end thereof so as to accommodate the insertion. The insertion has a hook formed on a bottom thereof, and the receiving trough has a cutout configured to engage with the hook, such that the insertion is engaged with the receiving trough of the connection ring firmly.

The connection ring includes a rib extending from the lower end thereof, and the stop ring includes an aperture defined on an upper end thereof and corresponding to the rib. The stop ring also includes multiple stopping fringes formed on a lower end thereof, and a cross section of a respective stopping fringe is arcuate so that the respective stopping fringe guides and stops the water.

Preferably, the receiving trough of the connection ring is vertically intersected with the rib so that when the rotatable operation rod is rotated, the connection ring scatters a stress to enhance a service life of the rib.

Preferably, the connection ring further includes the wear resistant ring fitted on an upper end thereof and configured to contact with an upper wall of the accommodation space so that the connection ring rotates smoothly.

DETAILED DESCRIPTION OF THE PREFERRED EMBODIMENTS

Figure 1:
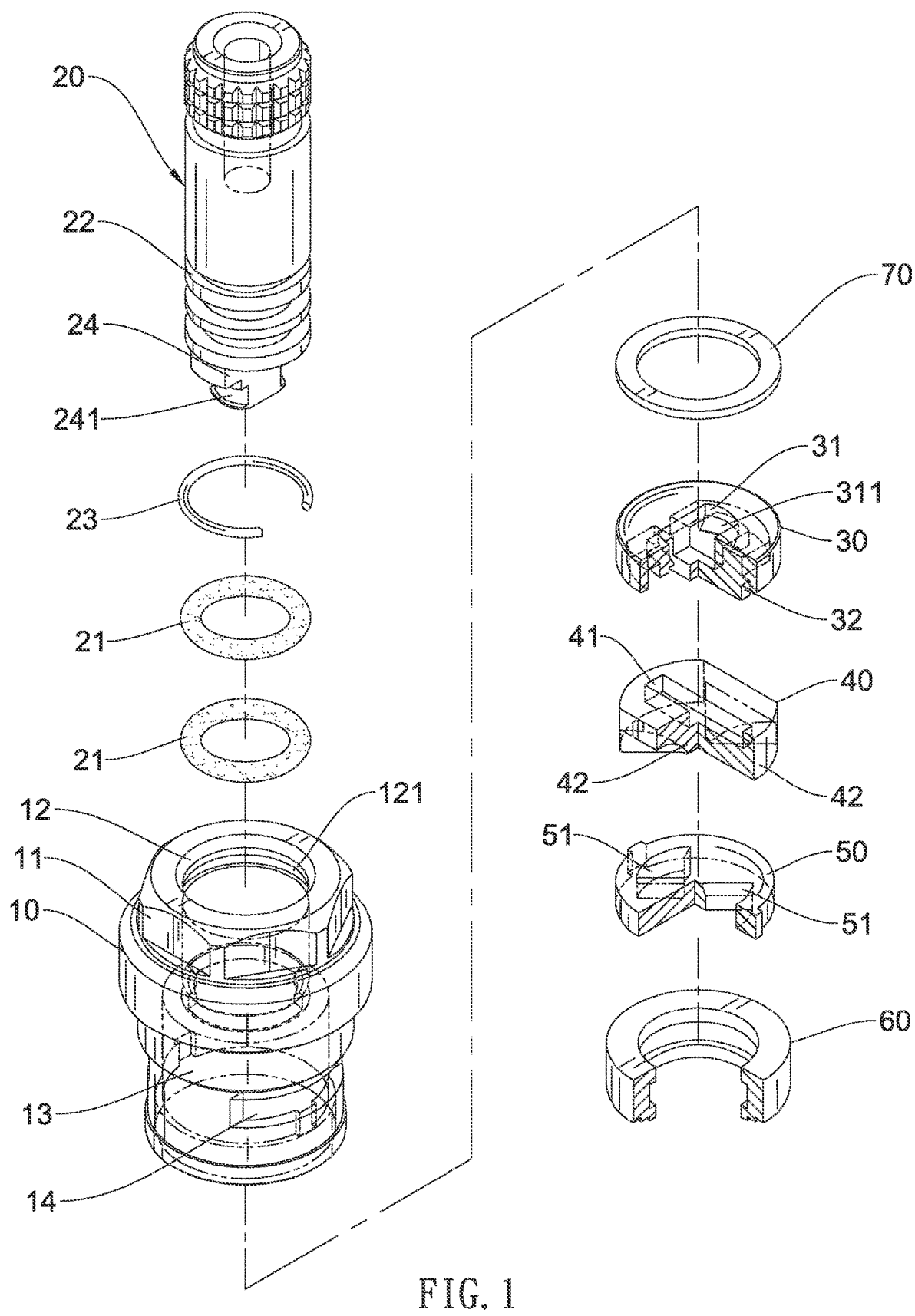
FIG. 1 is a cross-sectional perspective view showing the assembly of a connection structure of a ceramic cartridge of a faucet according to a preferred embodiment of the present invention.
Figure 2:
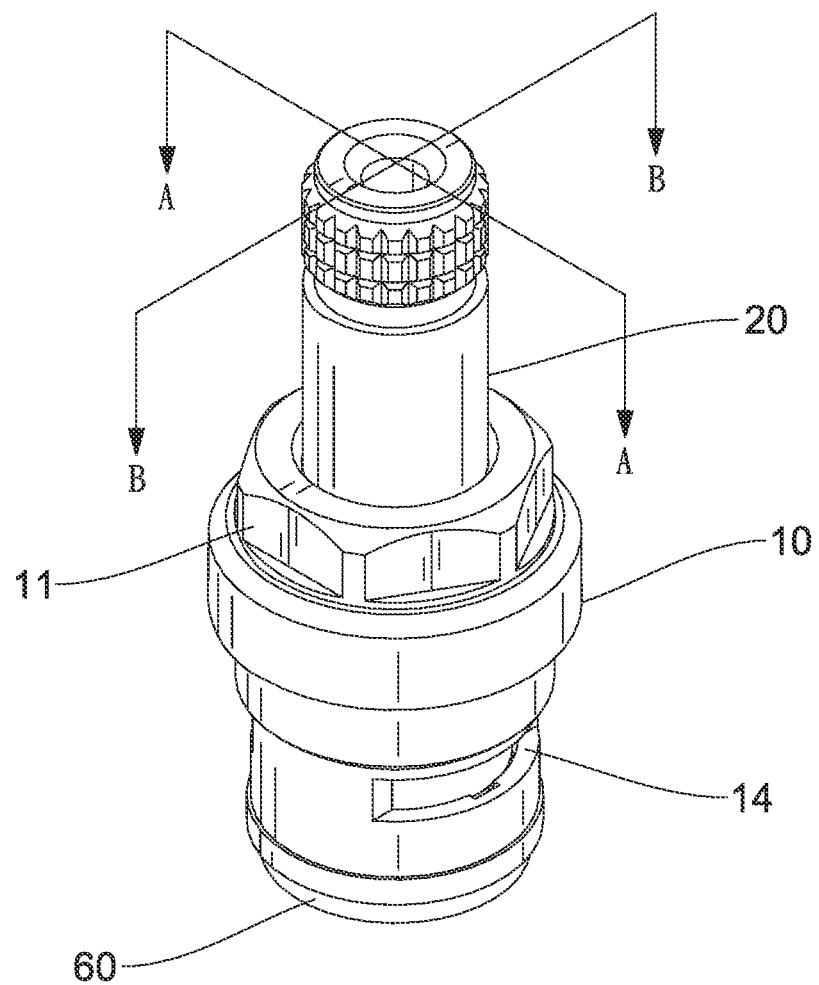
FIG. 2 is a perspective view showing the assembly of the connection structure of the ceramic cartridge of the faucet according to a preferred embodiment of the present invention.

With reference to FIGS. 1-2, a connection structure of a ceramic cartridge of a faucet according to a preferred embodiment of the present invention comprises: a control body 10, a rotatable operation rod 20, a connection ring 30, a stop ring 40, a guide ring 50, and a seal washer 60.

Figure 3:
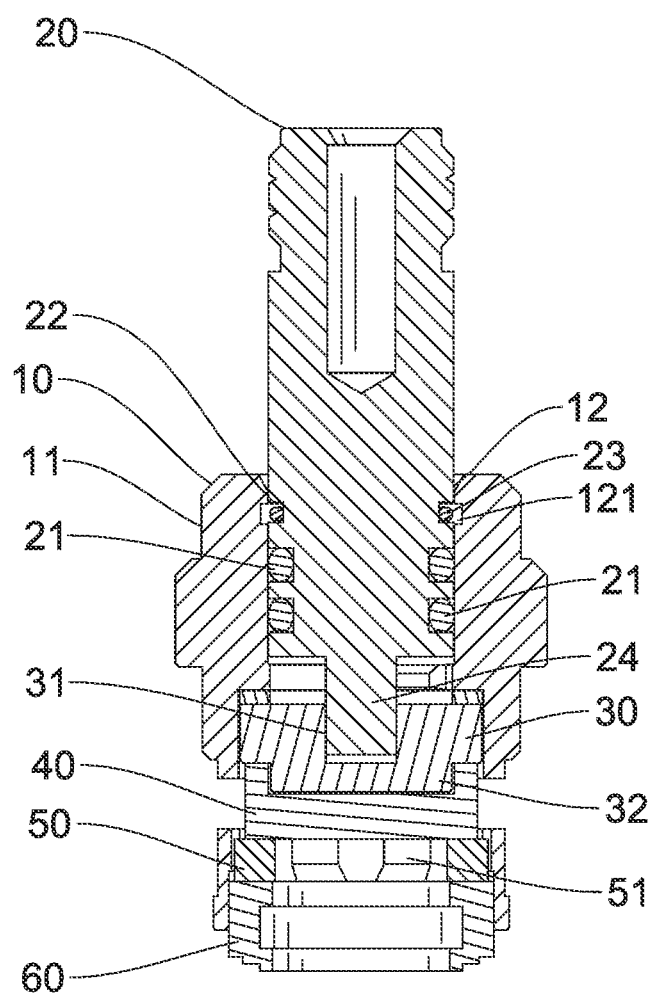
FIG. 3 is a cross sectional view taken along the line A-A of FIG. 2.
Figure 4:
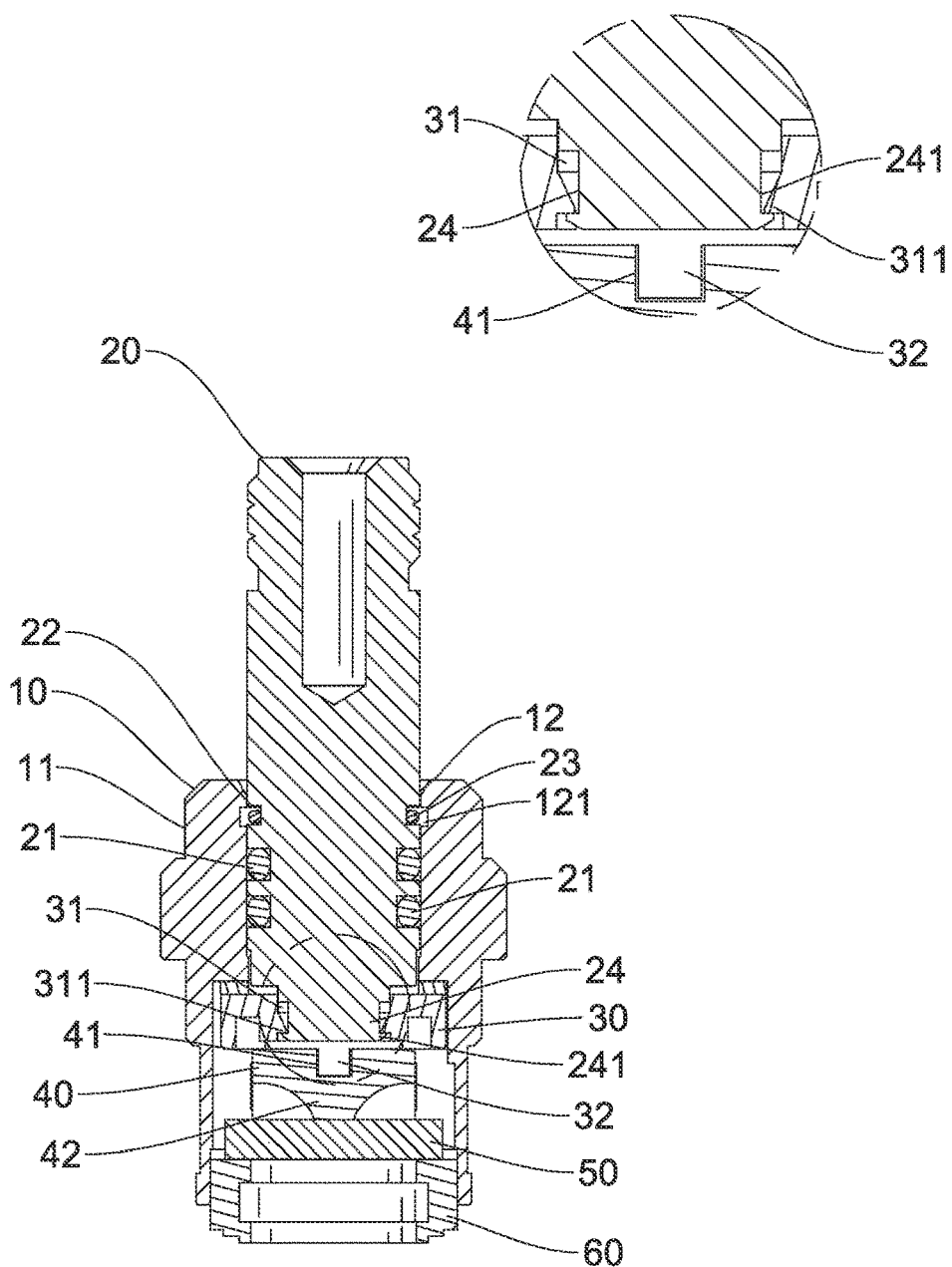
FIG. 4 is a cross sectional view taken along the line B-B of FIG. 2.

Referring to FIGS. 1 and 2, a structure of the control body 10 of the present invention is identical to a structure of a conventional body. The control body 10 includes an actuation section 11 formed on an upper end thereof and configured to connect with a hand tool so that the actuation section 11 is operated by the hand tool to lock the control body 10 with a body (not shown) of the faucet, an orifice 12 defined on a center thereof and configured to accommodate the rotatable operation rod 20, and a circular groove defined on a lower end of the control body 10 and being coaxial with the orifice 12, as shown in FIGS. 3 and 4, an accommodation space 13 is defined by the circular groove and the orifice 12, and the accommodation space 13 is configured to receive the connection ring 30, the stop ring 40, the guide ring 50, and the seal washer 60. The lower end of the control body 10 is connected with the body of the faucet so as to flow waters, and the control body 10 further includes an outlet 14 defined on a middle section thereof.

As illustrated in FIGS. 1, 3 and 4, the rotatable operation rod 20 includes multiple O rings 21 fitted thereon so that when the rotatable operation rod 20 is received in the orifice 12, the multiple O rings 21 stop a leakage of the waters. The orifice 12 has a recess 121 defined on an upper end thereof, and the rotatable operation rod 20 includes a notch 22 defined on a predetermined position thereof and accommodating a C retainer 23, such that the rotatable operation rod 20 is connected with the control body 10 by using the C retainer 23 securely.

With reference to FIGS. 1, 3 and 4, the rotatable operation rod 20 includes an insertion 24 extending from a lower end thereof, and the connection ring 30 includes a receiving trough 31 defined on an upper end thereof so as to accommodate the insertion 24, wherein the insertion 24 has a hook 241 formed on a bottom thereof, and the receiving trough 31 has a cutout 311 configured to engage with the hook 241, such that the insertion 24 is engaged with the receiving trough 31 of the connection ring 30 firmly.

Referring to FIGS. 1, 3 and 4, the connection ring 30 is connected with the rotatable operation rod 20, and a lower end of the connection ring 30 is connected with the stop ring 40. The rotatable operation rod 20 is rotated so that the connection ring 30 actuates the stop ring 40 to revolve simultaneously, wherein the connection ring 30 includes a rib 32 extending from the lower end thereof, and the stop ring 40 includes an aperture 41 defined on an upper end thereof and corresponding to the rib 32, the stop ring 40 also includes multiple stopping fringes 42 formed on a lower end thereof, as shown in FIG. 42, wherein a cross section of a respective stopping fringe 42 is arcuate so that the respective stopping fringe 42 guides and stops the water.

As shown in FIGS. 1, 3 and 4, the guide ring 50 is fixed on a lower end of the stop ring 40, and the guide ring 50 includes a fan-shaped hole 51 defined thereon and corresponding to the multiple stopping fringes 42, wherein the multiple stopping fringes 42 are communicated to flow the waters or are closed to stop the waters.

With reference to FIG. 1, the receiving trough 31 of the connection ring 30 is vertically intersected with the rib 32 so that when the rotatable operation rod 20 is rotated, the connection ring 30 scatters a stress to enhance a service life of the rib 32.

Referring to FIGS. 1, 3 and 4, the connection ring 30 further includes a wear resistant ring 70 fitted on an upper end thereof and configured to contact with an upper wall of the accommodation space 13 so that the connection ring 30 rotates smoothly.

As shown in FIGS. 1-4, in assembly, the connection ring 30, the stop ring 40, the guide ring 50, and the seal washer 60 are received in the accommodation space 13 of the control body 10, then the rotatable operation rod 20 is pushed downward from the upper end of the control body 10 so that the insertion 24 of the rotatable operation rod 20 is inserted and fixed in the receiving trough 31 of the connection ring 30.

Thereby, the cutout 311 of the connection ring 30 is engaged with the hook 241 of the rotatable operation rod 20. In case, the insertion 24 is not inserted in the receiving trough 31, the rotatable operation rod 20 is adjustably moved so that the insertion 24 is engaged in the receiving trough 31, and the rotatable operation rod 20 is pushed from the upper end of the control body 10 so that the C retainer 23 is engaged with the recess 121, thus connecting the rotatable operation rod 20 with the control body 10 easily and securely.

While the preferred embodiments of the invention have been set forth for purpose of disclosure, modifications of the disclosed embodiments of the invention and other embodiments thereof may occur to those skilled in the art. Accordingly, the appended claims are intended to cover all embodiments which do not depart from the spirit and scope of the invention.

What is claimed is:

1. A connection structure of a ceramic cartridge of a faucet comprising: a control body, a rotatable operation rod, a connection ring, a stop ring, a guide ring, and a seal washer;

the control body including an accommodation space, and the rotatable operation rod being received in the control body and connected with the connection ring, the stop ring, the guide ring and the seal washer being received in the accommodation space, a lower end of the control body being connected with a body of the faucet so as to flow waters, and the control body further including an outlet defined on a middle section of the control body;

the connection ring being connected with the rotatable operation rod, and a lower end of the connection ring being connected with the stop ring, such that the rotatable operation rod is rotated so that the connection ring actuates the stop ring to revolve simultaneously, and the stop ring including multiple stopping fringes formed on a lower end thereof;

the guiding ring being connected on the lower end of the stop ring, the guide ring including a fan-shaped hole defined thereon and corresponding to the multiple stopping fringes, and the multiple stopping fringes being communicated to flow the waters or are closed to stop the waters;

the stop ring being fixed on the lower end of the control body, and the connection ring, the stop ring and the guide ring being limited in the accommodation space;

wherein the control body includes an orifice defined on a center thereof and configured to accommodate the rotatable operation rod, and the rotatable operation rod includes multiple O rings fitted thereon to avoid a leakage of the waters;

wherein the orifice has a recess defined on an upper end thereof, and the rotatable operation rod includes a notch defined on a predetermined position thereof and accommodating a C retainer, such that the rotatable operation rod is connected with the control body by using the C retainer securely;

wherein the rotatable operation rod includes an insertion extending from a lower end thereof, and the connection ring includes a receiving trough defined on an upper end thereof so as to accommodate the insertion, wherein the insertion has a hook formed on a bottom thereof, and the receiving trough has a cutout configured to engage with the hook, such that the insertion is engaged with the receiving trough of the connection ring firmly;

wherein the connection ring includes a rib extending from the lower end thereof, and the stop ring includes an aperture defined on an upper end thereof and corresponding to the rib, the stop ring also includes the multiple stopping fringes formed on the lower end thereof, wherein a cross section of a respective stopping fringe is arcuate so that the respective stopping fringe guides and stops the water.

2. The connection structure as claimed in claim 1, wherein the receiving trough of the connection ring is vertically intersected with the rib.

3. The connection structure as claimed in claim 1, wherein the connection ring further includes a wear resistant ring fitted on an upper end thereof and configured to contact with an upper wall of the accommodation space so that the connection ring rotates smoothly.

* * * * *